United States Patent [19]

Renger et al.

[11] Patent Number: 5,416,825
[45] Date of Patent: May 16, 1995

[54] TESTING METHOD FOR SUBSCRIBER LINE TESTING

[75] Inventors: Wolfgang Renger; Gerald Zeitz, both of Munich, Germany

[73] Assignee: Siemens Aktiengesellschaft, Munich, Germany

[21] Appl. No.: 93,922

[22] Filed: Jul. 21, 1993

[30] Foreign Application Priority Data

Jul. 31, 1992 [EP] European Pat. Off. .......... 92113108

[51] Int. Cl.6 .................... H04M 1/24; H04M 3/22; H04M 3/08
[52] U.S. Cl. ............................... 379/29; 379/1; 379/10; 379/15; 379/27; 379/28
[58] Field of Search ............... 379/1, 2, 10, 15, 27-30

[56] References Cited

U.S. PATENT DOCUMENTS

| | | | |
|---|---|---|---|
| 3,571,530 | 3/1971 | Davies | 379/30 |
| 4,345,324 | 8/1982 | Smitt | 379/15 |
| 4,945,554 | 7/1990 | Krause et al. | 379/10 |
| 4,972,453 | 10/1990 | Daniel | 379/10 |
| 5,187,732 | 2/1993 | Suzuki | 379/15 |
| 5,195,124 | 3/1993 | Ishioka | 379/27 |
| 5,301,050 | 4/1994 | Czerwiec | 379/27 |

OTHER PUBLICATIONS

"Man–Machine Interface For Siemens EWSD", C. Augenstein et al, IEEE Global Telecommunications Conference, New Orleans, vol. 3, No. 2, Dec. 1985, pp. 4061–4065.

"Control Strategy of Integrated Testing Technology For The EWSD Periphery", Bert Eisl et al, Telcom Report 8 (1985) No. 1, pp. 25–31; and English translation of Testing Equipment in the System Periphery, p. 27.

Primary Examiner—Stephen Chin
Assistant Examiner—Vijay Shankar
Attorney, Agent, or Firm—Hill, Steadman & Simpson

[57] ABSTRACT

Testing method for subscriber line testing (TS, TL) in a program-controlled communications system or switching equipment (EWSD), whereby a first or a second test execution program module (CT, LT), a test address data program module (TA) and a test decision program module (UC) initiates and implements testing procedures. These are read out of a test data program module (CD) by version-associated query sequences in the sense of a decision tree (E) for the identification of test limit values. The test limit values that are needed for a line test can be prescribed by the operator.

20 Claims, 5 Drawing Sheets

TESTING METHOD FOR SUBSCRIBER LINE TESTING

BACKGROUND OF THE INVENTION

The present invention is directed to a testing method for subscriber line testing in a program-controlled communications system.

A functionally reliable telecommunications port is an important prerequisite for a telecommunications subscriber to reliably use the services and performance features of a telecommunications network or telecommunications system. The hardware and software modules required for a subscriber line testing system integrated in a telecommunications system are respectively implemented therein. In detail, processor-controlled testing procedures such as, for example, quality analysis, error recognition, error diagnosis or error localizing in a subscriber circuit/subscriber circuit module or at a subscriber line with subscriber terminal equipment can be implemented with the electronic hardware and software modules integrated in the systems. Furthermore, the subscriber line testing system of the telecommunications system enables an automatic test execution initiated via a telecommunication port. The above-identified subscriber line tests integrated in the system are controlled by operating software of a processor. This processor is arranged on a line trunk group that is integrated between a switching network and a subscriber line unit of a telecommunications system.

A plurality of the greatest variety of testing procedures are initiated by events during a subscriber line testing integrated in the system, such as, for example: acceptance of commands from a coordination processor; transmitting messages to a coordination processor; connect test access onto a unit under test (for example subscriber circuit, subscriber line with subscriber terminal equipment); seize testing equipment, and implement test.

The program modules that initiate and execute testing procedures can be constituted differently, since the telecommunications systems or telecommunications networks can be adapted to different demands and can also be designed specifically for countries and individually oriented to subscribers. A plurality of differently constituted hardware modules are tested by the testing procedures. Due to the different nature of the hardware modules, testing program steps and decision criteria must be supplemented in the testing program modules or testing procedures must be adapted to the respective hardware modules.

Test limit values for classification of the measured test values are required according to the nature of the measurement, the nature of the subscriber line circuit and of the subscriber terminal equipment and are stored in test program modules customized for different countries. Among other things, subscriber line parameters such as, for example, capacity values, DC values and impedance values are taken into consideration in their specification. A nationally tailored fashioning of the test limit values is determined by the hardware modules employed in the telecommunications system and by the demands made of the telecommunications system by the respective telecommunications companies. The test limit values to be utilized in the program modules are dependent on a plurality of individual factors, for example: feed network of the subscriber circuit; exchange voltage; and, input impedance of the subscriber circuit, as well as the attenuation of the transmission/reception level. Furthermore, customer wishes must be taken into consideration in the realization and in the execution of the testing procedures as well as in the definition of the test limit values.

Testing procedures to be implemented can be divided into at least two test algorithms dependent on the nature of the "unit under test", for example a subscriber line circuit, a digital or analog subscriber line unit. A first test algorithm contains the testing of subscriber circuits and a second test algorithm contains the testing of the subscriber line with subscriber terminal equipment. During the execution of the test algorithms, an identified measured test value is respectively compared to an upper and to a lower test limit value in order to subsequently undertake a test quality classification (go/no go statement). Customer wishes with respect to modifications of an execution of a test algorithm after an implementation of the test program modules or of a matching of the test program modules to an individual line embodiment previously involved high work outlay.

A nationally customized adaptation of test limit value or a customer-associated adaptation of test limit values in a subscriber line circuit test required an involved software adaptation work in the respective test program modules. The software adaptation jobs, however, lead to a multitude of variant formations of a test program module and to a great documentation outlay in the test program modules produced in every instance. A variation of test limit values for an individual subscriber line test was previously not possible. Further, customer wishes with respect to an adaptation of test limit values could not be subsequently accepted in a subscriber line test. A test-oriented adaptation following a system modification or a modernization of the subscriber line test configured to be country-specific, required a great programming outlay. A classification of the measured test values proceeding beyond a "go" or "no go" statement was previously not possible, for example with respect to a quality statement about a "unit under test" in the subscriber line test. Errors in the test program executions respectively required an individual correction per patch.

SUMMARY OF THE INVENTION

It is an object of the present invention to provide a testing method such that this can be utilized independently of country-associated areas of employment and system components of a telecommunications.

This object is inventively achieved by a testing method for subscriber line testing in a program-controlled communications system and/or switching equipment that can be set version-specific, whereby test procedures are selected and implemented by at least one test execution program module, and whereby stored version-associated test limit values are utilized for the classification of identified test measured value data. Version-associated query sequences are read out from a test data program module in the sense of a decision tree for the identification of test limit values. Test limit values stored in the test data program module are accessed dependent on the identifications formed in the processing of the query sequences. The most important advantage of the inventively realized testing method is that this is fashioned completely independently of country. The test program modules previously employed can continue to be employed in every country after a program-oriented restructuring. Furthermore, every version of a subscriber line circuit to be tested can be unproblematically integrated in a test algorithm without noteworthy programming outlay in the test algorithm. An exact quality statement about a line condition derives as a consequence of finely adapted test limit values as well as test quality classes belonging thereto.

In addition to the advantage that a country-specific adaptation of the test program algorithm can be implemented at any time, the invention additionally provides the additional advantage that the previously arising documentation outlay for the individual test program modules is eliminated.

A further development of the present invention is that the test limit values that classify the measured value data of the test for a subscriber-associated line or circuit arrangement can be matched to the changing circuit-oriented demands. This yields the advantage that the operator of a telecommunications system or switching equipment can adapt the test limit values to the modifications of the telecommunications network at any time. Likewise, newly defined quality criteria can be immediately introduced into the test procedures by the operator of a telecommunications system as a basis of new quality statements.

A further advantageous development of the present invention is that, given a modification of the country-specific and subscriber-associated test limit values, these changes can be centrally undertaken in a test data program module. An additional test program documentation of other test modules participating in the test algorithm is not necessary since the test program modules previously integrated in the testing procedure need not be modified.

The testing method implements test preparations that distinguish between external and internal subscriber equipment and forwards test measurement commands to a test unit.

A central test control program module has access to the test program modules.

Test program module data, particularly subscriber circuit types, source addresses, decision criteria, test limit values, as well as data of a coordination processor are intermediately stored in a backup memory.

The decision criteria is formed from country-dependent system data of the communications system or switching equipment.

The test limit values that classify the test measured value data can be adapted in country-associated fashion in the program-controlled communications system or switching equipment.

The test limit values that classify the test measured value data for a configured subscriber-associated line arrangement are adjustably prescribed.

The first test data program module can access basic data of a communications system and implements a comparing test procedure for comparing the basic data to system data from the test data program module. The basic data is subscriber data.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
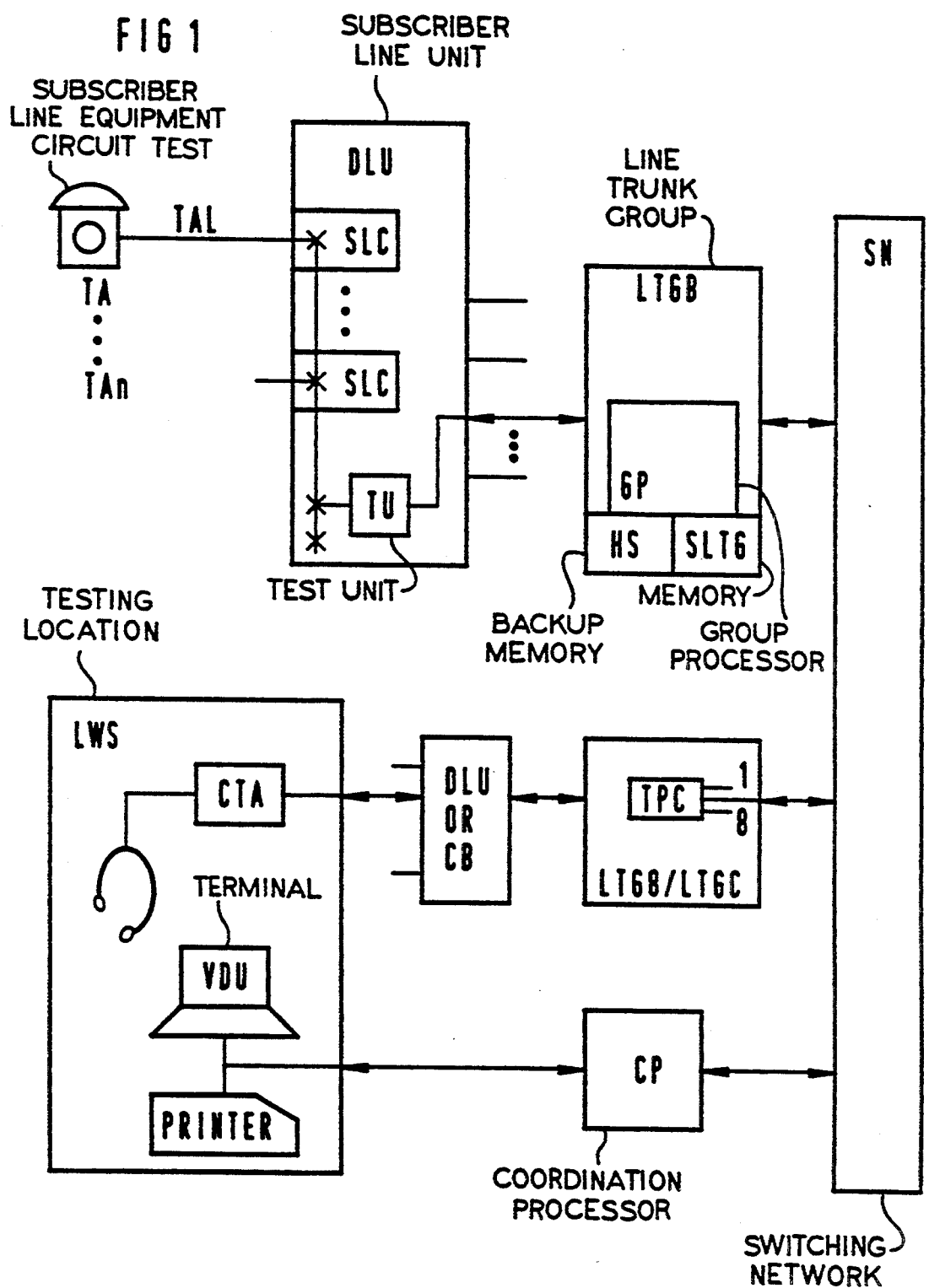
FIG. 1 is a schematic illustration of a testing system in the form of a block circuit diagram.

FIG. 1 shows a schematic illustration of a test system in the form of a block circuit diagram. The testing of a subscriber circuit/subscriber circuit module can thereby be stated proceeding from a subscriber line circuit testing location LWS. A subscriber line circuit test TA, potentially with a subscriber terminal equipment, can be initiated via what is referred to as a ringback service RBS, via the operating terminal or via the subscriber testing location LWS. The ringback service serves as an automatic testing location partner for a maintenance technician for testing subscriber line circuits TAL and subscriber circuits TAn. When a subscriber circuit/subscriber circuit module TS/TL, a subscriber line TAL with subscriber terminal equipment is tested, then a test algorithm is initiated at the terminal VDU of the telecommunications system EWSD by inputting a test command, for example TEST DLULC (subscriber circuit) or TEST SUB (subscriber line). A coordination processor CP forwards a test request to a group processor GP responsible for the subscriber line unit DLU, this group processor GP being arranged on a line trunk group LTGB. The call setup to a test unit TU is controlled by the group processor GP in whose area the subscriber/subscriber line unit ("unit under test") to be tested is included in circuit-oriented terms. A central test control program module TLFI is implemented in the group processor GP, this central test control program module TLFI respectively driving the test program modules UC, CT, TA, LT, CD ... (for more detailed explanations regarding the test program modules, see FIG. 2 and the description appertaining thereto), whereby respectively three byte-by-byte data words are read out from these.

Figure 2:
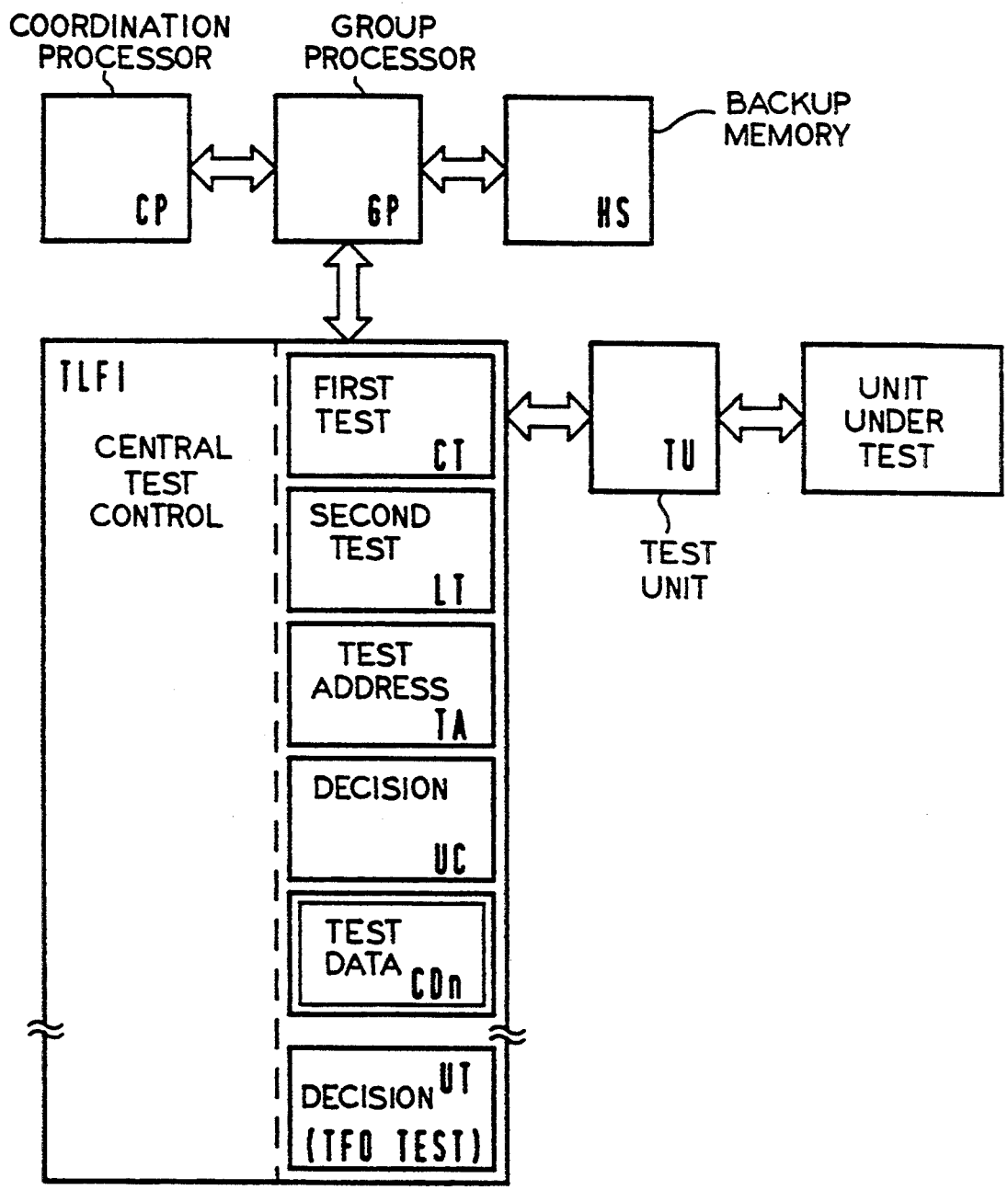
FIG. 2 depicts the test program modules participating in a testing method.

FIG. 2 shows the test program modules UC, UT, TA, CT, LT, CD1 ... CDn ... that participate in the testing method. Test tables, test limit values as well as test executions are involved in test algorithms that initiate and execute test procedures. These program modules that execute test procedures are as follows:

Test Decision Program Module UC

This program module checks whether the hardware modules to be tested are integrated in the communication or switching system in conformity with the system and decides about the implementation of the test of the special functions of a subscriber module.

Test Data Program Modules CD

This program module is fashioned dependent on country. All test limit values and decision criteria necessary for a test procedure (subscriber circuit test) are arranged in groups and are noted in the test program modules CD.

First Test Program Execution Modules CT

This test program module contains test tables for testing the subscriber circuit TS and the test units TU.

Second Test Execution Program Module LT

This program module contains test tables for the tests of the subscriber line TL.

Test Address Program Module TA

This program module contains addresses for all test tables that are noted in the first and second test execution program module CT, LT.

Figure 3:
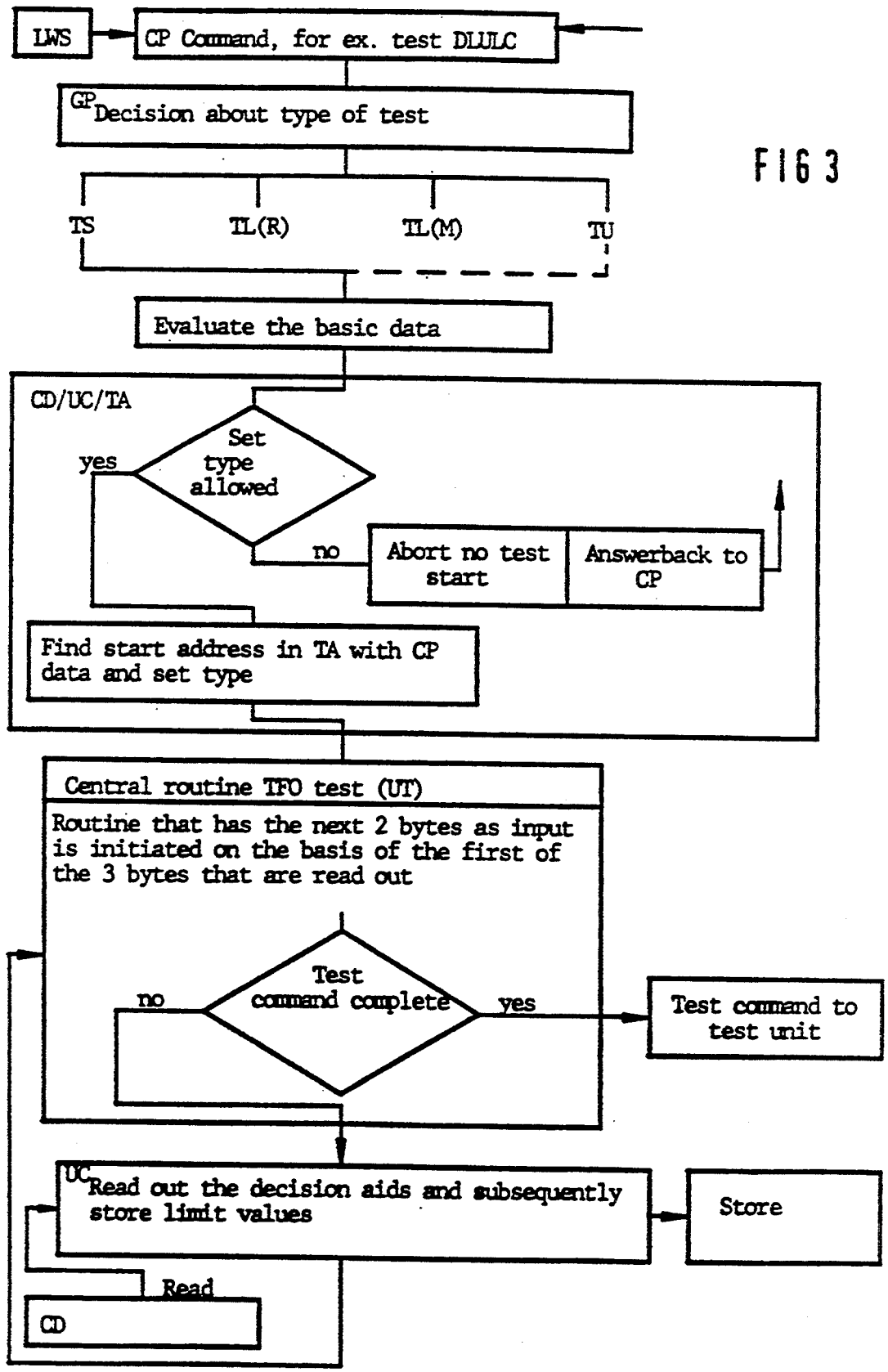
FIG. 3 is a flowchart for illustrating testing program steps during a subscriber line circuit test.

FIG. 3 shows a flowchart for illustrating test program steps during a subscriber line circuit test. All previously undertaken limit values and all decision criteria are classified in groups and are stored in a country-associated test program module CD. The test tables in the first test execution program modules CT merely define the execution and the sequence of the tests. The routines in the test decision program modules UC and UT address the correct test limit value in the test program module CD on the basis of the corresponding decision criteria. The starting addresses of all test procedures for the subscriber circuits TS are provided in the test table program module TA. What subscriber circuits are actually utilized in the corresponding country is determined, among other things, on the basis of the decision criteria. An operator of a telecommunications system EWSD can transmit a test command (for example, TEST DLULC) to a coordination processor CP via the operating terminal VDU. As a result of the test command, a group processor GP is informed which type of test program algorithm TS, TL(R), TL(M) or TU is to be executed. After a first "rough setting", the basic data such as, for example port number hardware module type that are critical for the testing routine and are noted in the telecommunications or switching system is compared to the data noted in the test program module CD.

When, for example, it is found on the basis of the data comparison that the subscriber circuit TS to be tested is not noted in the test program module, then an abort of the test procedure and an answer back to the coordination processor CP occurs. This can be a first indication for the operator of the switching equipment or of the communications system that hardware modules have been subsequently introduced into the communication system or are being operated without authorization. This statement is especially valuable when hardware modules conforming to the system were utilized and do not meet the technical demands. When a positive statement about the hardware module to be tested occurs, then the starting address in the test address program module TA for the test tables that are noted in the first test execution program module CT is identified on the basis of the data from the coordination processor CP and of the type of connector set, for example SLM:COS (subscriber line circuit module, analogous; for normal subscribers), SLM:CMRL (subscriber line circuit module, analogous; meter pulse injection) ... On the basis of a central routine TFO TEST implemented in the operating software, a first of three bytes to be read out is interpreted and a routine is initiated with the input of the next two bytes. In this way, the test limit values appertaining thereto are read out from the country-dependent test data program module CD on the basis of corresponding decision criteria and are intermediately stored. The starting addresses of all test program routines noted in the test table program module TA are limited to a version of the subscriber circuit employable the respective telecommunications system EWSD or switching technology. What subscriber circuit TS is actually utilized in the telecommunications system is determined on the basis of the decision criteria (for example, feed network, exchange voltage, input impedance and transmission/reception level). The central test routine TFO TEST reads three bytes out of a test execution program module CT until all data necessary for a measurement command are intermediately stored in a backup memory HS and a measurement command to the test unit TU has occurred. A measured test value that has been determined is compared to a classifying test limit value. Given a no go statement, this measured test value PM is displayed at a terminal VDU and/or is output via a printer listing of a testing location.

After an evaluation of the measured test value PM, the central test routine TFO TEST reads three further bytes out of the test execution program module CT in the fashion of an "endless loop". As a consequence of the sequence defined in the test execution, a plurality of tests can be implemented. The following test measurements for testing a subscriber circuit TS can be implemented by the test execution program:

measuring the connection and disconnection of the ringing voltage,
 measuring the feed voltage without load,
 measuring the feed voltage with load in the high-impedance condition,
 measuring the feed voltage with load in the low-impedance condition,
 testing the short-to-ground recognition,
 testing the loop recognition,
 measuring the pass band attenuation analog/digital,
 measuring the pass band attenuation digital/analog,
 measuring the quiescent noise,
 measuring the transhybrid loss,
 measuring the symmetry of the feeding bridge.

Additional testing steps are to be implemented at the subscriber circuits TS having special functions:

measuring the metering pulses,
 testing the function "reverse polarity",
 testing the function "reverse the polarity noise-free",
 testing the function "feed interruption".

In a self-test of the test unit TU, the following tests are implemented by the test execution program module CT:

testing the disconnection of all indicators,
 testing for the response of all indicators,
 testing all measuring circuits for the measurement of DC
 voltage, AC voltage, capacitance and impedance,
 testing the level transmitter and level receiver.

Figure 4A:
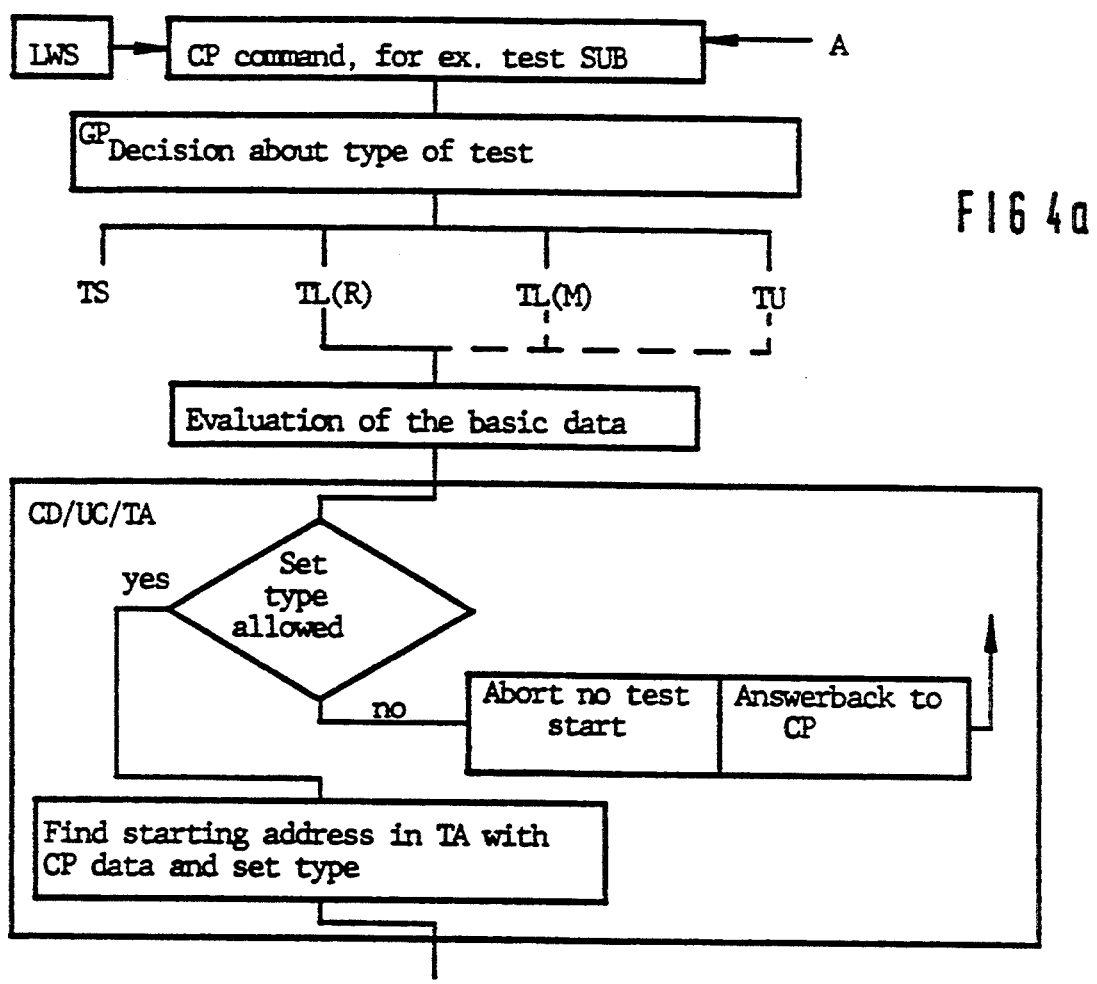
FIGS. 4A and 4B depict a flowchart for illustrating test program steps with reference to a subscriber line test.
Figure 4B:
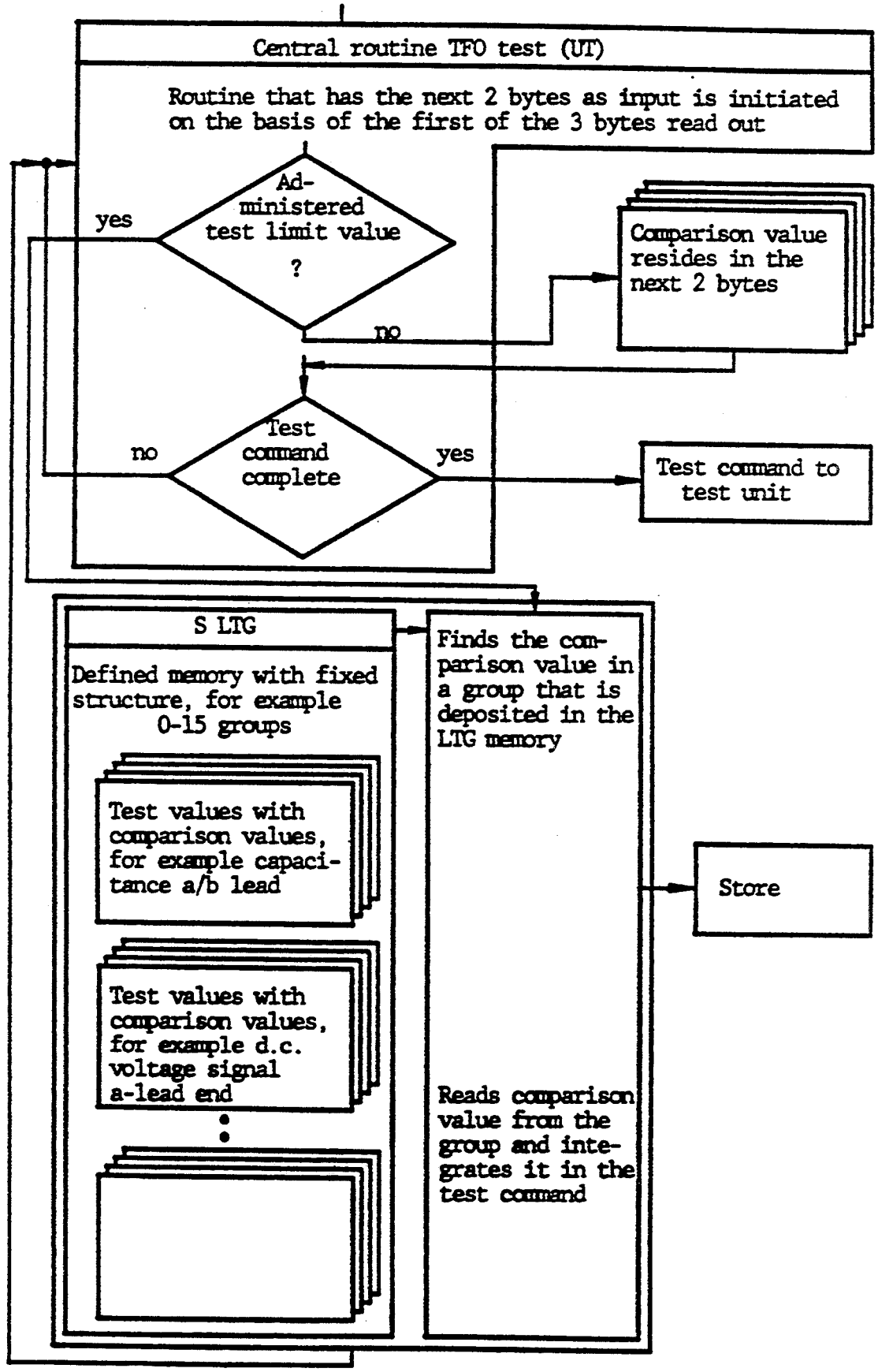

FIGS. 4A and 4B depict a flowchart for illustrating test program steps during a subscriber line circuit test TL. The test program execution in a subscriber line circuit test differs from the test program execution of a subscriber circuit test to the affect that a second test execution program module LT is initiated on the basis of the data from the coordination processor CP to the group processor GP, whereby a query for an "administered" measured test value ensues before the beginning of a testing routine. When the query is answered with a no, then the next two bytes that indicate the test limit value are read out from the central test routine TFO TEST. When the query is answered yes, the corresponding test limit value can be read out from a permanently defined memory area SLTG of a line trunk group LTG. These country-independent arrangements of the test limit values are especially advantageous since the operator of a telecommunications network has his own ideas about the level of a test limit value in a specific test quality group. The operator of the telecommunications network thereby has the possibility, via a software command (man-machine language: MML command), of storing these test limit values himself in a memory area SLTG permanently allocated for this in the line trunk group LTG. The different performance types of a telecommunications network can have a plurality of different quality groups and test limit values allocated to them.

The operator thereby has the possibility of modifying every individual test limit value in every test group. When no specific test limit value is established, it is initialized with the measuring limits of the test module TU.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A testing method for subscriber line testing in at least one of a program-controlled communications system and switching equipment therein that is version-specific settable, comprising the steps of:
    selecting and implementing test procedures by at least one test execution program module to provide test measured values;
    using stored, version-associated test limit values for country classification of the test measured values;
    reading out version-associated query sequences from a test data program module according to a decision tree for identification of test limit values; and
    accessing test limit values stored in the test data program module dependent on identifications formed in processing of the query sequences.

2. The testing method according to claim 1, wherein the testing method further comprises implementing test preparations that distinguish between external and internal subscriber equipment and forwarding test measurement commands to a test unit.

3. The testing method according to claim 1, wherein a central test control program module has access to the test program modules.

4. The testing method according to claim 1, wherein the testing method further comprises intermediately storing test program module data in a backup memory.

5. The testing method according to claim 4, wherein the test program module data comprises subscriber circuit types, source addresses, decision criteria, test limit values, and data of a coordination processor.

6. The testing method according to claim 1, wherein the method further comprises forming decision criteria from country-dependent data of the communications system or switching equipment.

7. The testing method according to claim 1, wherein the method further comprises adapting the test limit values to test limit values for a selected country in the program-controlled communications system or switching equipment.

8. The testing method according to claim 1, wherein the method further comprises adjustably prescribing the test limit values that classify the test measured value data for a configured subscriber-associated line arrangement.

9. The testing method according to claim 1, wherein the method further comprises accessing, by first test data program module, basic data of a communications system and implementing a comparing test procedure to compare the basic data to system data from the test data program module.

10. The testing method according to claim 9, wherein the basic data is subscriber data.

11. A testing method for subscriber line testing in at least one of a program-controlled communications system and switching equipment therein that is version-specific settable, comprising the steps of:
    selecting and implementing test procedures by at least one test execution program module to provide test measured values;
    using stored, version-associated test limit values for classification of the test measured values, the test limit values being adapted to test limit values for a selected country in the program-controlled communications system or switching equipment;
    reading out version-associated query sequences from a test data program module according to a decision tree for identification of test limit values, decision criteria therefor being formed from country-dependent data of the communications system or switching equipment; and
    accessing test limit values stored in the test data program module dependent on identifications formed in processing of the query sequences.

12. The testing method according to claim 11, wherein the testing method further comprises implementing test preparations that distinguish between external and internal subscriber equipment and forwarding test measurement commands to a test unit.

13. The testing method according to claim 11, wherein a central test control program module has access to the test program modules.

14. The testing method according to claim 11, wherein the testing method further comprises intermediately storing test program module data in a backup memory.

15. The testing method according to claim 14, wherein the test program module data comprises subscriber circuit types, source addresses, decision criteria, test limit values, and data of a coordination processor.

16. The testing method according to claim 11, wherein the method further comprises accessing, by first test data program module basic, data of a communications system and implementing a comparing test procedure to compare the basic data to system data from the test data program module.

17. A testing method for subscriber line testing in at least one of a program-controlled communications system and switching equipment therein that is version-specific settable, comprising the steps of:
    selecting and implementing test procedures by at least one test execution program module to provide test measured values;
    using stored, version-associated test limit values for classification of the test measured values, the test limit values being adapted to test limit values for a selected country in the program-controlled communications system or switching equipment;

reading out version-associated query sequences from a test data program module according to a decision tree for identification of test limit values, decision criteria therefor being formed from country-dependent data of the communications system or switching equipment;

accessing test limit values stored in the test data program module dependent on identifications formed in processing of the query sequences; and accessing, by a first test data program module, basic data of the communications system and implementing a comparing test procedure to compare the basic data to system data from the test data program module.

18. The testing method according to claim 17, wherein a central test control program module has access to the test program modules.

19. The testing method according to claim 17, wherein the testing method further comprises intermediately storing test program module data, in a backup memory.

20. The testing method according to claim 17, wherein the method further comprises adjustably prescribing the test limit values that classify the test measured value data for a configured subscriber-associated line arrangement.

* * * * *